(12) United States Patent
Takahashi

(10) Patent No.: US 7,973,442 B2
(45) Date of Patent: Jul. 5, 2011

(54) PERMANENT MAGNET-TYPE ROTARY ELECTRIC MACHINE AND PRODUCTION METHOD FOR ROTOR FOR PERMANENT MAGNET-TYPE ROTARY ELECTRIC MACHINE

(75) Inventor: Toshimitsu Takahashi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 156 days.

(21) Appl. No.: 12/440,652

(22) PCT Filed: May 16, 2008

(86) PCT No.: PCT/IB2008/001215
§ 371 (c)(1),
(2), (4) Date: Mar. 10, 2009

(87) PCT Pub. No.: WO2008/142519
PCT Pub. Date: Nov. 27, 2008

(65) Prior Publication Data
US 2010/0013338 A1 Jan. 21, 2010

(30) Foreign Application Priority Data
May 23, 2007 (JP) ................. 2007-136985

(51) Int. Cl.
*H02K 1/27* (2006.01)
*H02K 15/03* (2006.01)
*H01F 41/02* (2006.01)

(52) U.S. Cl. ............... 310/156.53; 29/598; 310/156.82; 310/156.38; 310/156.21; 310/156.62

(58) Field of Classification Search .............. 310/156.38, 310/156.53, 156.62, 156.08, 156.09, 156.11, 310/156.12, 156.13, 156.14, 156.21; H02K 15/03; H01F 41/02
See application file for complete search history.

(56) References Cited

U.S. PATENT DOCUMENTS

| | | | |
|---|---|---|---|
| 6,359,359 B1 | 3/2002 | Miura et al. | |
| 2004/0046469 A1* | 3/2004 | Oshima et al. | 310/156.21 |
| 2004/0212265 A1* | 10/2004 | Yeh et al. | 310/156.21 |
| 2007/0090708 A1 | 4/2007 | Takahashi et al. | |

FOREIGN PATENT DOCUMENTS

| | | | |
|---|---|---|---|
| EP | 1 237 253 A2 | | 9/2002 |
| JP | 07107687 A | * | 4/1995 |
| JP | 08-163801 A | | 6/1996 |
| JP | 11-252833 A | | 9/1999 |
| JP | 2000-228838 A | | 8/2000 |

(Continued)

*Primary Examiner* — Quyen Leung
*Assistant Examiner* — Terrance Kenerly
(74) *Attorney, Agent, or Firm* — Sughrue Mion, PLLC (57) ABSTRACT

A production method for a rotor for a permanent magnet-type rotary electric machine, includes the step (S01, S02) of forming a magnet piece that has a plurality of groove portions that are provided on at least one of end surfaces of the magnet piece in a predetermined direction, the step (S03) of stacking a plurality of formed magnet pieces so that adjacent magnet pieces contact each other and the plurality of groove portions of one of the adjacent magnet pieces cross with the plurality of groove portions of another one of the adjacent magnet pieces, and the step (S04) of inserting and disposing the plurality of stacked magnet pieces into a hole formed in a rotor core.

10 Claims, 5 Drawing Sheets

FOREIGN PATENT DOCUMENTS

| | | | |
|---|---|---|---|
| JP | 2000-324736 A | | 11/2000 |
| JP | 2001-025189 A | | 1/2001 |
| JP | 2001284119 A | * | 10/2001 |
| JP | 2003-134750 A | | 5/2003 |
| JP | 2004180491 A | * | 6/2004 |
| JP | 2006-136130 A | | 5/2006 |

* cited by examiner

PERMANENT MAGNET-TYPE ROTARY ELECTRIC MACHINE AND PRODUCTION METHOD FOR ROTOR FOR PERMANENT MAGNET-TYPE ROTARY ELECTRIC MACHINE

BACKGROUND OF THE INVENTION

1. Field of the Invention

This invention relates to a permanent magnet-type rotary electric machine and a production method for a rotor for the permanent magnet-type rotary electric machine. More particularly, the invention relates to a permanent magnet-type rotary electric machine capable of achieving high output by reducing eddy current, and a production method for a rotor for the permanent magnet-type rotary electric machine.

2. Description of the Related Art

Figure 6:
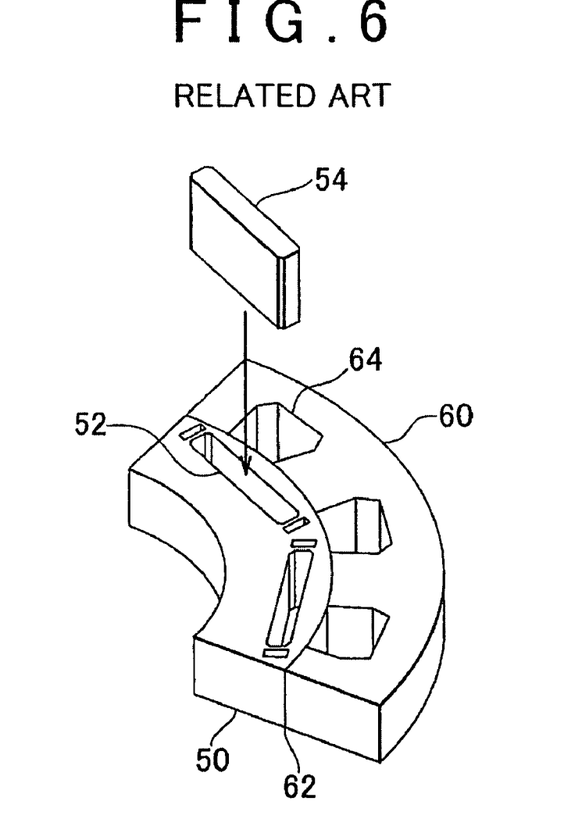
FIG. 6 is a diagram showing a construction of portions of a permanent magnet-type rotary electric machine according to a related art.

A rotor of a permanent magnet-type rotary electric machine is formed, for example, as shown in FIG. 6. That is, a rotor core 50 is provided with a plurality of holes 52, and permanent magnets 54 are inserted into the holes 52, so that magnetic poles are formed. The rotor is rotationally driven on the basis of the rotating magnetic fields formed by electrifying the coils of a stator 60 disposed surrounding the rotor core 50. Since the permanent magnets 54 form magnetic fields separately for the individual predetermined magnetic poles, a small-size construction and high output can be achieved.

It is to be noted herein that since the magnetic fluxes produced by the coils of the stator 60 penetrate the permanent magnets 54, eddy currents occur in the permanent magnets 54. In the case where a permanent magnet 54 inserted into a hole 52 of the rotor core 50 is made up of a single body as shown in FIG. 6, there occurs, in the permanent magnet 54, an eddy current whose current path is wide and extends in the entire single-body magnet. The eddy currents produced in magnets give rise to conspicuous problems of heat generation and loss as the rotary electric machines are reduced in size, and improved in speed, and improved in output. Specifically, heat generation leads to the demagnetization of the magnets in a rotary electric machine, which becomes a cause of a failure of the rotary electric machine. Besides, the loss by the eddy current reduces the efficiency of the rotary electric machine.

Therefore, in the permanent magnet-type rotary electric machines, a reduction of the eddy current that occurs in a magnet is an important task, and structures of permanent magnets in which the eddy current is restrained are considered, for example, in Japanese Patent Application Publication No. 2000-324736 (JP-A-2000-324736), Japanese Patent Application Publication No. 2000-228838 (JP-A-2000-228838), and Japanese Patent Application Publication No. 2006-136130 (JP-A-2006-136130).

Figure 7A:
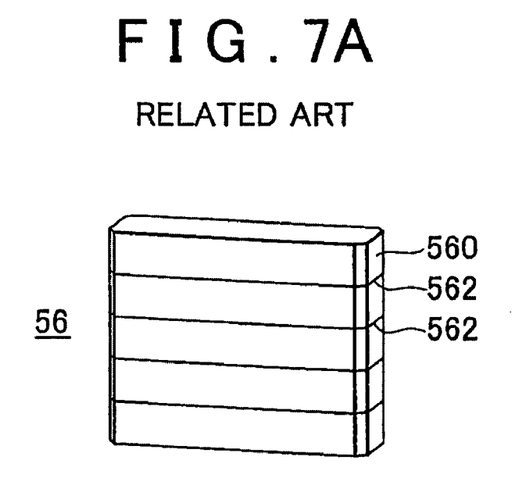
FIG. 7 is a diagram showing a structure of a permanent magnet in a permanent magnet-type rotary electric machine according to a related art.

FIG. 7A is a diagram showing a structure of a permanent magnet in a permanent magnet-type rotary electric machine described in Japanese Patent Application Publication No. 2000-324736 (JP-A-2000-324736).

Referring to FIG. 7A, a permanent magnet 56 inserted into one of the holes 52 of the rotor core 50 is constructed of a plurality of permanent magnet pieces 560 arranged in a direction perpendicular to the rotation direction (which corresponds to the direction of the rotation axis). That is, the permanent magnet pieces 560 are equivalent to a plurality of permanent magnet pieces obtained by dividing the single-body permanent magnet 54 shown in FIG. 6. In the description below, the permanent magnet 56 in accordance with this structure will be simply referred to as "divided-type permanent magnet".

An insulation material 562 for securing electrical insulation is interposed between adjacent permanent magnet pieces 560. The insulation material 562 used herein is, for example, an insulation paper, an insulation tape, or a synthetic resin such as epoxy resin or the like. Furthermore, each of the permanent magnet pieces 560 has been subjected to an insulation process in which each piece is coated with an insulation material (not shown).

Figure 7B:
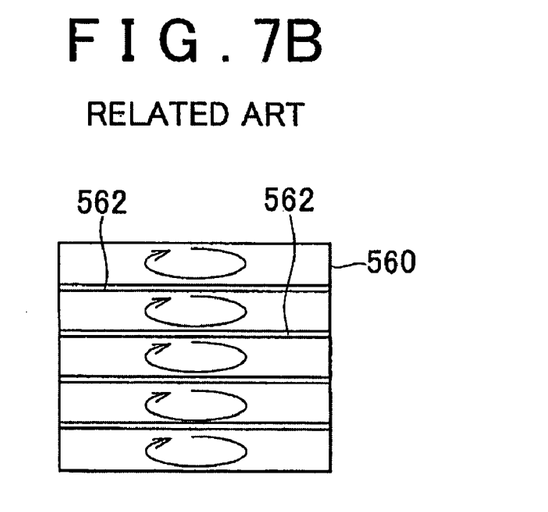

FIG. 7B is a diagram showing eddy currents that occur in the permanent magnet 56 shown in FIG. 7A. Referring to FIG. 7B, the eddy currents flow in the individual permanent magnet pieces 560, along current paths shown by arrows. That is, the current path of eddy current changes from a single path that is the current path extending in the entire single-body magnet into a plurality of paths that correspond to the number of divisions of the permanent magnet 56.

According to this structure, the current path of eddy current is divided, so that the total sum of the divided lengths becomes greater than the length of the current path of the single-body magnet. Therefore, the electric resistance to eddy current becomes larger, that is, eddy current less readily flows, so that the eddy current loss and heat generation can be reduced.

It is to be noted herein that in order to effectively restrain the production of eddy current in the foregoing divided-type permanent magnet 56, there is a need to make small each one of the divided current paths of eddy current. To this end, there is a need to increase the number of divisions so that each one of the permanent magnet pieces 560 becomes sufficiently small.

However, when the number of divisions is increased, the volume occupied by the insulation material provided for each permanent magnet piece 560 enlarges, and the apparent intensity of magnetism declines. Therefore, there arises a problem of the output torque of the rotary electric machine declining in comparison with the single-body permanent magnet 54.

Furthermore, the divided-type permanent magnet also poses a problem in productivity, that is, the cost needed for the electric insulation process makes it difficult to reduce the production cost.

In detail, as for the divided-type permanent magnet 56 shown in FIG. 7A, the permanent magnet pieces 560 formed piece by piece need to be electrically insulated by the insulation materials 562 before being assembled into an integral-body permanent magnet. The cost associated with this insulation process has been a factor that inhibits the cost reduction. In particular, as for the foregoing effect of reducing the eddy current, the effect obtained becomes higher if the number of divisions of the permanent magnet 56 is greater and therefore the electric resistance to the eddy current is higher. However, increasing the number of divisions results in increasing the cost needed for the insulation treatment.

As a structure that eliminates the need for the insulation treatment, Japanese Patent Application Publication No. 2000-228838 (JP-A-2000-228838) discloses a permanent magnet that is divided into a plurality of permanent magnets so that adjacent permanent magnets are placed in partial contact due to slits (hereinafter, the permanent magnet in accordance with this structure will be simply referred to as "slit-type permanent magnet").

However, the slit-type permanent magnet, too, has a problem as follows. That is, since there is a need to increase the total number of slits in order to effectively restrain the occurrence of eddy current, the proportion of the slits to the entire volume of the permanent magnets becomes large, so that the output torque of the rotary electric machine declines.

Furthermore, since the processing for slits requires considerations for avoiding impairment of the strength of the permanent magnet, the production steps are complicated, and it becomes difficult to expect a great effect in reducing the cost.

Furthermore, Japanese Patent Application Publication No. 2006-136130 (JP-A-2006-136130) discloses a permanent magnet that is constructed so that electrical insulation between permanent magnet pieces is secured by gap portions that are formed at end portions of adjacent permanent magnet pieces when a plurality of permanent magnet pieces are stacked.

According to this permanent magnet, in the case where the magnetic flux density at the foregoing end portions is relatively high and therefore eddy current flows concentratedly in the end portions, the electric resistance in the end portions becomes high and therefore the eddy current can be effectively reduced. However, in the case where the magnetic flux density is substantially uniform, there occurs a problem of being unable to reduce the eddy current that flows in the portions other than the foregoing end portions.

SUMMARY OF THE INVENTION

The invention provides a rotor for a permanent magnet-type rotary electric machine which reduces the eddy current simply at low cost and also achieves high output, and a production method for the rotor.

A first aspect of the invention relates to a permanent magnet-type rotary electric machine including a stator, and a rotor in which a permanent magnet is embedded and which is provided rotatably relative to the stator, the permanent magnet including a plurality of magnet pieces that are stacked so as to be in contact with each other in a predetermined direction. The permanent magnet-type rotary electric machine is characterized in that, of the plurality of magnet pieces, a first magnet piece and a second magnet piece are adjacent to each other, and a contact surface of the first magnet piece to the second magnet piece has a plurality of first groove portions that extend in a first direction, and a contact surface of the second magnet piece to the first magnet piece has a plurality of second groove portions that extend in a second direction that crosses with the first direction.

According to the foregoing permanent magnet-type rotary electric machine, each magnet piece is electrically separated from its adjacent magnet pieces by a high contact resistance caused by a small contact area. Therefore, the eddy current loss and heat generation can be restrained simply at low cost, without performing an insulation process on each magnet piece. Besides, the omission of an insulation material-increases the space factor of the permanent magnet occupying a hole of the rotor core, so that the output torque of the rotary electric machine can be increased and high efficiency can be achieved.

Also, according to the foregoing permanent magnet-type rotary electric machine, adjacent magnet pieces have a point contact therebetween, and therefore, microscopically, gap portions are formed on the contact surfaces. Since the gap portions perform substantially the same function as slits, it is possible to restrain the eddy current loss and heat generation simply at low cost without performing the process of forming slits. Besides, the omission of slits increases the space factor of the permanent magnet occupying a hole of the rotor core, so that the output torque of the rotary electric machine can be increased and high efficiency can be achieved.

In the foregoing aspect, the plurality of magnet pieces are formed by dividing an integral molding by cut-off processing. The groove portions are machining grooves that are formed by the cut-off processing.

According to this permanent magnet-type rotary electric machine, by actively utilizing the machining grooves formed by the cut-off process, the electrical insulation between adjacent magnet pieces can easily be secured.

A second aspect of the invention relates to a production method for a rotor for a permanent magnet-type rotary electric machine. This production method includes the steps of: forming a magnet piece that has a plurality of groove portions that are provided on at least one of end surfaces of the magnet piece in a predetermined direction; stacking a plurality of magnet pieces formed in the forming step so that adjacent magnet pieces contact each other and the plurality of groove portions of one of the adjacent magnet pieces cross with the plurality of groove portions of another one of the adjacent magnet pieces; and inserting and disposing the plurality of magnet pieces stacked in the stacking step into a hole formed in a rotor core.

According to the foregoing production method for a rotor for a permanent magnet-type rotary electric machine, adjacent magnet pieces are electrically separated from each other by high contact resistance, and therefore the insulation process performed on each magnet piece can be omitted. Hence, a permanent magnet-type rotary electric machine can be formed simply at low cost. Besides, the omission of the insulation material increases the space factor of the permanent magnet occupying a hole of the rotor core, so that the output torque of the rotary electric machine can be increased and high efficiency can be achieved.

In the foregoing aspect, the step of forming the magnet piece includes the step of dividing an integral molding into the plurality of magnet pieces by performing cut-off processing on the integral molding in a direction perpendicular to the predetermined direction. The step of stacking the plurality of magnet pieces may include the step in which every other one of the plurality of divided magnet pieces in the predetermined direction are inverted in a rotation direction that is horizontal to cut surfaces of the magnet pieces, and the step in which the plurality of magnet pieces are stacked so that the cut surfaces of adjacent magnet pieces contact each other.

According to the production method for a rotor for a permanent magnet-type rotary electric machine, since the machining grooves formed on the cut surfaces of the permanent magnet pieces by the cut-off process are actively utilized, it is possible to omit the polish process performed on the cut surfaces in the related-art production steps of the permanent magnet. In consequence, a permanent magnet-type rotary electric machine can be formed more simply at lower cost.

In the foregoing method, the cut-off processing is performed by using a rotary blade. According to the production method for a rotor for a permanent magnet-type rotary electric machine, the standard of the cut-off accuracy in the cut-off processing can be relaxed, so that a permanent magnet-type rotary electric machine can be formed more simply at lower cost.

According to this invention, the eddy current can be reduced by a simple magnet structure, and the cost of the permanent magnet-type rotary electric machine can be reduced to a low level.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described in detail hereinafter with reference to the drawings. In the drawings, the same reference characters show the same or corresponding portions.

Figure 1A:
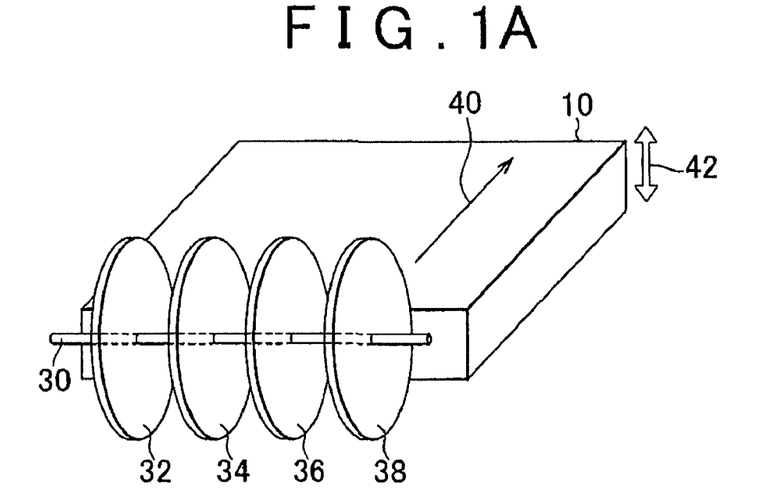
FIGS. 1A to 1C are diagrams showing production steps for a permanent magnet in a permanent magnet-type rotary electric machine in accordance with an embodiment of the invention.
Figure 1B:
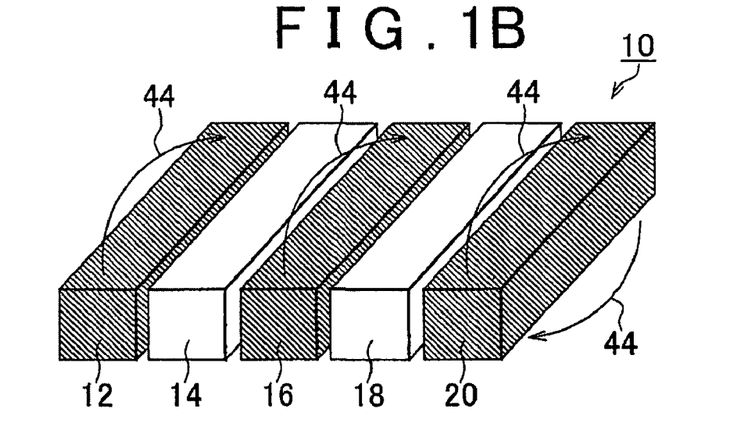
Figure 1C:
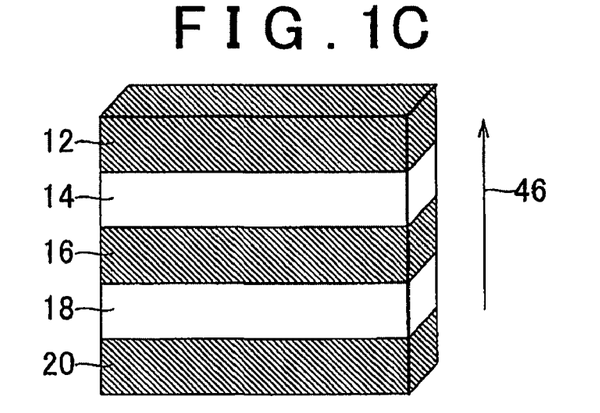

FIGS. 1A to 1C are diagrams showing production steps for a permanent magnet of a permanent magnet-type rotary electric machine in accordance with an embodiment of the invention.

Referring to FIGS. 1A to 1C, a permanent magnet inserted into a hole of a rotor core has a divided-type magnet structure, as a basic structure, which is made by arranging a plurality of permanent magnet pieces in a predetermined direction. The predetermined direction is, for example, one of the direction of the rotation axis of the rotor, the rotation direction of the rotor, the direction of a radius of the rotor.

More specifically, as shown in FIG. 1A, an integral molding 10 is subjected to cut-of processing. Due to this cut-off processing, the molding 10 is divided into a plurality of magnet pieces.

In detail, the molding 10 is formed into a desired shape by a magnet-forming powder into a die that serves as a mold, and by pressurizing the powder in a perpendicular direction by pressing from above the die, although not shown by illustration. In this pressurizing step, a magnetic field is applied to the magnet-forming powder from outside the mold. As a result, in the formed molding 10, the direction of the axis of easy magnetization is a direction shown by an arrow 42.

Then, rotary blades 32 to 38 are inserted into the molding 10 from an end surface of the molding 10 in a direction horizontal to the direction of the easy magnetization axis. The rotary blades 32 to 38 have substantially the same diameter and thickness, and are fixed to a common rotating shaft 30 with predetermined intervals left between the blades. Therefore, by rotationally driving the rotating shaft 30 at a constant rotation speed by a drive circuit (not shown), the rotary blades 32 to 38 rotate integrally at the rotation speed. By moving the rotary blades 32 to 38 in the direction of the arrow 40, the molding 10 is cut at predetermined intervals. As a result, the molding 10 is divided into a plurality of magnet pieces 12 to 20 each of which is a generally rectangular parallelepiped in shape as shown in FIG. 1B.

The rotary blades 32 to 38 used herein are, for example, rotary blades in which a blade edge made of a superabrasive (diamond powder or the like) is attached to an outer peripheral edge of a hollow disc-shape base plate that is made of a hard metal (tungsten carbide or the like). Therefore, uniform machining grooves are formed along a planar direction in the cut surfaces of each of the magnet pieces 12 to 20.

Next, as shown in FIG. 1B, of the plurality of magnet pieces 12 to 20, every other piece in the direction of division is inverted in a turning direction that is horizontal to the cut surface. In this drawing, the magnet pieces 12, 16, 20 are inverted in a direction shown by arrows 44. By inverting every other magnet piece in this manner, the mutually-facing cut surfaces of two adjacent magnet pieces have their machining grooves crossed with each other.

Finally, as shown in FIG. 1C, the plurality of magnet pieces 12 to 20 with every other one of them inverted are stacked so that a cut surface of a magnet piece contacts the cut surface of the magnet piece that is adjacent thereto. The stacked magnet pieces 12 to 20 are inserted and disposed as an integral magnet into a hole of the rotor core. At this time, the magnet pieces 12 to 20 are inserted so that the stacking direction shown by an arrow 46 coincides with one of the rotation axis direction, the rotation direction and the direction of a radius of the rotor. Then, through a magnetizing step, an integral permanent magnet is formed.

Figure 2:
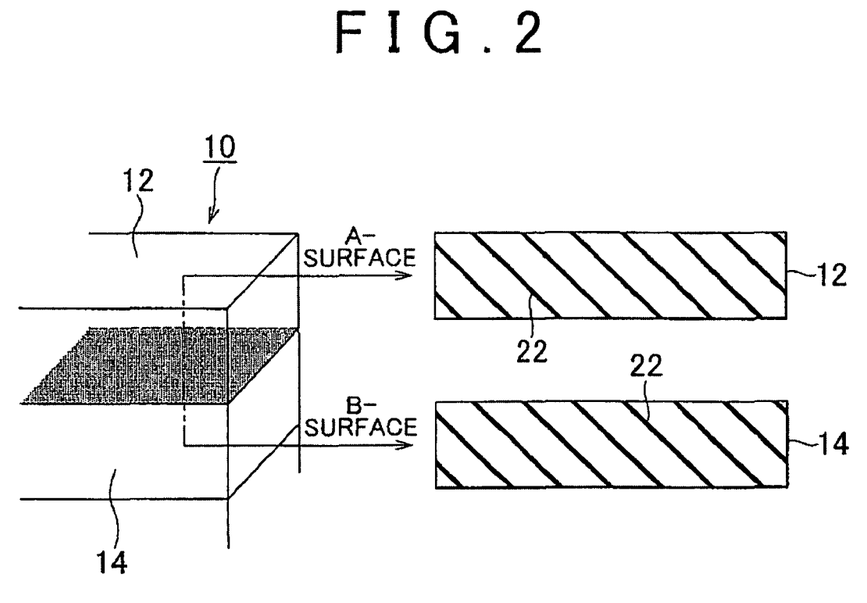
FIG. 2 is a diagram for describing a structure of the permanent magnet produced by the production steps shown in FIGS. 1A to 1C.

FIG. 2 is a diagram for describing a structure of a permanent magnet that is produced by the production steps shown in FIG. 1. In FIG. 2, a portion of a permanent magnet is extracted for description.

Referring to FIG. 2, the magnet piece 12 and the magnet piece 14 are formed through the cut-off processing of the molding 10 using the rotary blades. After one of the magnet pieces, for example, the magnet piece 12, is inverted, the magnet pieces 12, 14 are stacked so that cut surfaces thereof contact each other.

The cut surface of the magnet piece 12 seen from the magnet piece 14 (which corresponds to the A-surface in FIG. 2) has a plurality of machining grooves 22 that were formed by the cut-off processing. The machining grooves 22 extend obliquely to the length direction of the cut surface.

Similarly, the cut surface of the magnet piece 14 seen from the magnet piece 12 (which corresponds to the B-surface in FIG. 2) has a plurality of machining grooves 22 that were formed by the cut-off processing.

Figure 3:
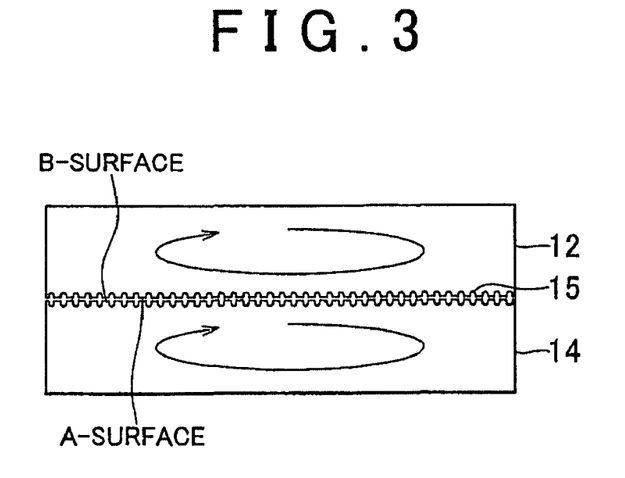
FIG. 3 is a diagram showing eddy currents that occur in the permanent magnet shown in FIG. 2.

Then, due to the inversion of the magnet piece 12, when the cut surfaces of the magnetic pieces 12, 14 are brought into contact, the machining grooves 22 of the magnetic piece 12 cross with the machining grooves 22 of the magnetic piece 14 Therefore, the state of contact of the magnet piece 12 and the magnet piece 14 is a point-contact state in which they contact each other at the contact points of protruded portions of the two magnet pieces as shown in FIG. 3. Microscopically, this is equivalent to formation of gap portions 15 that are interspersed along planar directions of the contact surfaces. As a result, the contact resistance between the magnet piece 12 and the magnet piece 14 becomes high, so that the magnet piece 12 and the magnet piece 14 become electrically separated.

FIG. 3 is a diagram showing eddy currents that occur in the permanent magnet shown in FIG. 2. Referring to FIG. 3, since the adjacent magnet pieces 12, 14 are electrically separated, eddy currents flow along current paths as shown by arrows within the individual magnet pieces. Specifically, the current paths of eddy currents are electrically partitioned by the foregoing gap portions 15, and are divided into a plurality of paths extending in the individual magnet pieces 12, 14. This makes the electric resistance to eddy current higher than in the case where a permanent magnet is constructed by a single-body magnet. Therefore, the eddy current can be reduced. The reduction of eddy current will restrain the loss and heat generation caused by eddy current, so that demagnetization and damages to the rotary electric machine can be avoided.

As described above, the magnet structure according to the invention is substantially the same as the above-described related-art divided-type magnet structure (see FIG. 7A) in that the current path of eddy current is divided into a plurality of paths. That is, both magnet structures of the invention and the related art can achieve similar effects of reducing eddy current.

The invention also achieves an advantageous effect over the related-art magnet structure, in that the aforementioned effect can be realized with a simpler magnet structure and with a low cost.

Furthermore, a rotary electric machine equipped with a magnet structure according to the invention achieves an advantageous effect in terms of performance, that is, an effect of being able to outputting greater torques than the related-art permanent magnet-type rotary electric machine. These advantageous effects will be described in detail below.

In detail, as an effect in productivity, the permanent magnet according to the invention allows omission of the process for electrical insulation performed on each of the permanent magnet pieces 560, unlike the divided-type permanent magnet 56 shown in FIG. 7A. Concretely, the insulation material 562 provided between adjacent permanent magnet pieces 560 becomes unnecessary. Besides, the insulation process, for example, coating each of the permanent magnet pieces 560 with an insulation material, or the like, becomes unnecessary. Therefore, it becomes possible to form a permanent magnet-type rotary electric machine simply at low cost.

Furthermore, with respect to a slit-type permanent magnet, the permanent magnet according to this invention also allows omission of the process for forming slits. Specifically, in the slit-type permanent magnet, increasing the number of slits makes it possible to further reduce the eddy current. However, due to the increased number of slits, the permanent magnet correspondingly has greater loss of magnet that corresponds to the slit portions, and therefore the material yield deteriorates. Furthermore, the strength of the permanent magnet declines, giving rise to a risk of damage of the magnet.

In contrast, in the permanent magnet according to invention, since the gap portions 15 formed on the contact surfaces of magnet pieces perform substantially the same function as the slits, it is possible to reduce the eddy current simply at low cost without requiring a complicated process.

Furthermore, according to the permanent magnet according to the invention, since the machining grooves formed on the cut surfaces of the permanent magnet pieces subjected to the cut-off processing are actively utilized, it is possible to omit the polish process performed on the cut surfaces in the related-art production steps of the permanent magnet. Besides, the standard of the cut-off accuracy in the cut-off processing can be relaxed in comparison with the production steps of the related-art divided-type permanent magnet. Therefore, a simple and low-cost permanent magnet-type rotary electric machine can be formed.

Next, as an effect in respect of performance of the rotary electric machine, since the space factor of the magnet occupying a hole of the rotor core is higher than in the related-art magnet structure, greater torque output can be obtained.

In detail, in the divided-type permanent magnet 56 shown in FIG. 7A, as the number of divisions is increased, the volume occupied by the insulation material 562 interposed between the permanent magnet pieces 560 enlarges, and therefore, it becomes difficult to obtain a desired torque output, as stated above.

Furthermore, in the slit-type permanent magnet, the processing for slits is ordinarily performed by inserting a edged tool of a predetermined width vertically to an end surface of the permanent magnet. Therefore, the opening width of the slit is univocally determined by the width of the edged tools used, and cannot be made to be equal to or less than a width that is other than the width of the edged tool. Therefore, the proportion (space factor) of the permanent magnet occupying a hole becomes low, that is, the permanent magnet becomes apparently weak, so that torque declines.

In contrast, according to the permanent magnet according to the invention, the volume occupied by the gap portions 15 that are microscopically formed is conspicuously smaller than the volume occupied by the insulation material 562 and the slits, the space factor of the permanent magnet occupying the same volume increases relative to the related-art permanent magnet. Therefore, the permanent magnet-type rotary electric machine according to the invention can output greater torque.

As described above, the permanent magnet according to the is able to reduce the eddy current simply at low cost and improve the output torque, in comparison with the related-art permanent magnet.

Furthermore, the permanent magnet according to the invention achieves an advantageous effect of being able to reduce the eddy current more effectively than the permanent magnet disclosed in Japanese Patent Application Publication No. 2006-136130 (JP-A-2006-136130) which is constructed so that electrical insulation between permanent magnet pieces is secured by gap portions that are formed at end portion of adjacent permanent magnet pieces when permanent magnet pieces are stacked.

That is, the permanent magnet described in Japanese Patent Application Publication No. 2006-136130 (JP-A-2006-136130) reduces the eddy current by dividing the eddy current path into a plurality of current paths in end portions of the permanent magnet. This structure is effective in the case where the magnetic flux density at the end portions of the permanent magnet is relatively high. However, in the case where the magnetic flux density is substantially uniform over the entire surface of the permanent magnet, the structure causes an eddy current whose current path is wide and extends in the entire portion of the permanent magnet excluding the end portions, and therefore it becomes difficult to sufficiently reduce the eddy current.

In contrast, according to the permanent magnet according to the invention, since the electrical insulation between adjacent permanent magnet pieces is uniformly secured along planar directions of the contact surfaces by the gap portions 15, the path of the eddy current that occurs in the permanent magnet can be reliably partitioned, and the eddy current loss can be reliably reduced.

Figure 4:
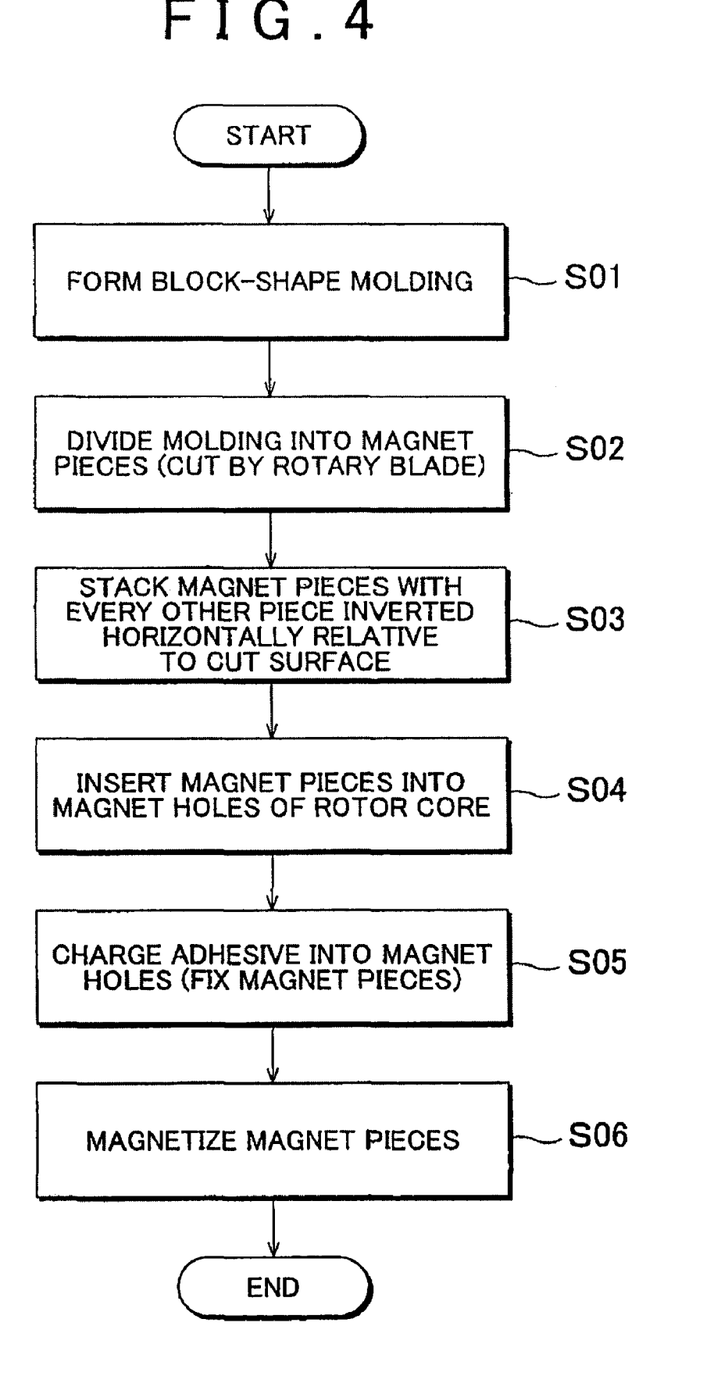
FIG. 4 is a flowchart for describing production steps for a permanent magnet in a permanent magnet-type rotary electric machine in accordance with an embodiment of the invention.

FIG. 4 is a flowchart for describing the production steps for a permanent magnet in a permanent magnet-type rotary electric machine in accordance with an embodiment of the invention.

Referring to FIG. 4, firstly, a block-shape molding 10 (FIG. 1) is formed by pressurizing a magnet-forming powder charged in a die (step S01). In the thus-formed molding 10, the direction of the easy magnetization axis is the direction perpendicular to a main plane, due to the external magnetic field applied in the pressurizing step.

Next, cut-off processing is performed on the molding 10 (step S02). The cut-off processing is carried out by moving the rotary blades 32 to 38 (FIG. 1) through the molding 10 from an end surface to the opposite end surface thereof in a direction horizontal to the direction of the easy magnetization axis. Thus, the molding 10 is divided into a plurality of magnet pieces 12 to 20.

Then, of the magnet pieces 12 to 20, every other piece in the direction of division is inverted in a turning direction that is horizontal to the cut surface. Thus, the mutually-facing cut surfaces of two adjacent magnet pieces have their machining grooves crossed with each other. The magnet pieces 12 to 20 with every other one of them inverted are stacked so that a cut surface of a magnet piece contacts the cut surface of the magnet piece that is adjacent thereto (step S03).

The stacked magnet pieces 12 to 20 stacked in step S03 are inserted and disposed as an integral magnet into a hole of a rotor core (step S04). At this time, the magnet pieces 12 to 20 are inserted so that the stacking direction thereof coincides with one of the rotation axis direction, the rotation direction and the direction of a radius of the rotor.

Next, an adhesive (or a filler) is charged into gaps between the wall of the hole of the rotor core and the magnet therein, so that the magnet is fixed to the rotor core by the adhesive (step S05). Finally, magnetization is performed from radially outward of the rotor core so as to form an integral permanent magnet (step S06).

Figure 5:
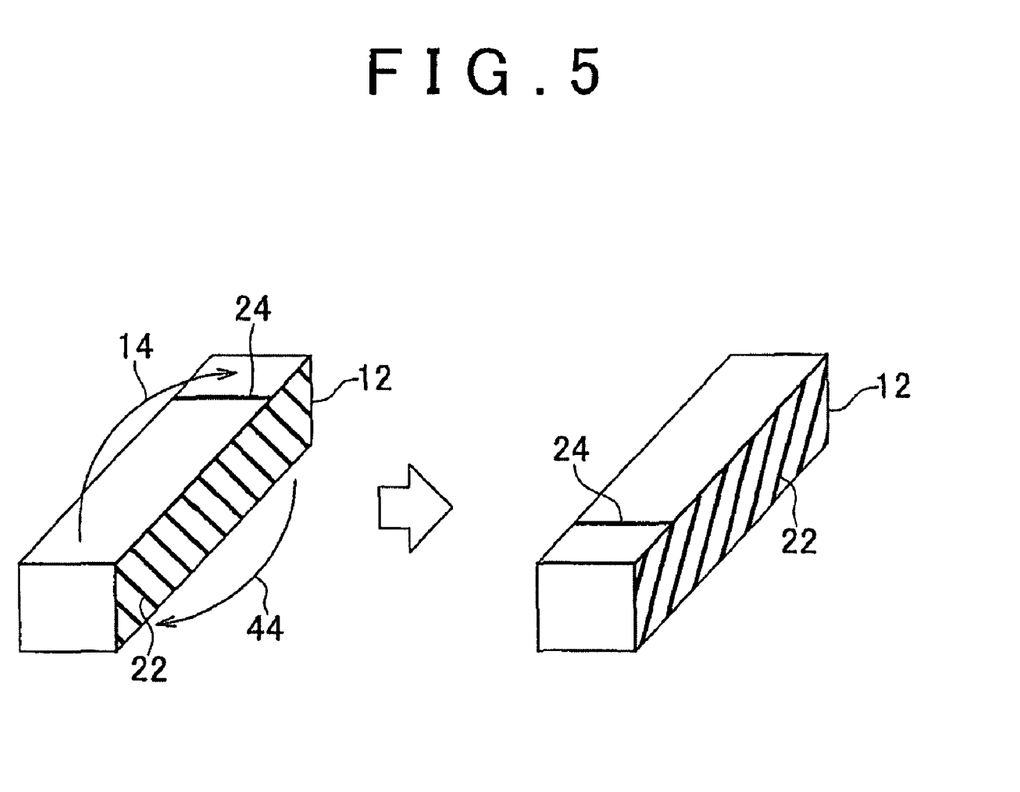
FIG. 5 is a diagram showing a modification of the production steps for a permanent magnet according to the embodiment of the invention.

Incidentally, in the cut-off process shown by step S02 in the flowchart shown in FIG. 4, a side surface of each of the magnet pieces (e.g., the magnet piece 12) to be inverted in the subsequent step S03 which is other than the cut surfaces may be labeled beforehand with a marking 24 as shown in FIG. 5. This makes it possible to easily determine whether each inversion-object magnetic piece has been inverted during the process of step S03, so that the operation efficiency improves and further cost reduction can be achieved.

As described above, according to the embodiment of the invention, since a plurality of magnet pieces divided by the cut-off processing are arranged so that the machining grooves formed on a cut surface of a magnet piece cross with the machining grooves formed on the cut surface of the magnet piece that is adjacent to the aforementioned cut surface, the magnet pieces are electrically separated from each other. Therefore, the process for forming slits in a permanent magnet or the insulation process becomes unnecessary, and the loss and heat generation caused by eddy current can be restrained more simply at lower cost.

Furthermore, since it becomes unnecessary to provide an insulation material covering a permanent magnet piece or form a slit, the space factor of the permanent magnet is heightened, and the torque output of the rotary electric machine can be improved.

The embodiments disclosed herein should be considered to be illustrative in all respects and not restrictive. The scope of the invention is shown not by the foregoing description but by the claims for patent, and is intended to cover all modifications within the meaning and scope equivalent to the claims for patent.

This invention is applicable to permanent magnet-type rotary electric machines in which a permanent magnet is disposed in a rotor.

The invention claimed is:

1. A permanent magnet-type rotary electric machine, comprising:
   a stator; and
   a rotor in which a permanent magnet is embedded and which is provided rotatably relative to the stator, wherein:
   the permanent magnet includes a plurality of magnet pieces that are stacked so as to be in contact with each other in a predetermined direction; and
   of the plurality of magnet pieces, a first magnet piece and a second magnet piece are adjacent to each other, and a contact surface of the first magnet piece to the second magnet piece has a plurality of first groove portions that extend in a first direction, and a contact surface of the second magnet piece to the first magnet piece has a plurality of second groove portions that extend in a second direction that crosses with the first direction.

2. The permanent magnet-type rotary electric machine according to claim 1, wherein the plurality of magnet pieces are formed by dividing an integral molding by cut-off processing, and the first and second groove portions are machining grooves that are formed by the cut-off processing.

3. The permanent magnet-type rotary electric machine according to claim 1, wherein the predetermined direction coincides with a direction selected from the group consisting of a rotation axis direction of the rotor, a rotation direction of the rotor, and a radius direction of the rotor.

4. A production method for a rotor for a permanent magnet-type rotary electric machine, comprising:
   forming a magnet piece that has a plurality of groove portions that are provided on at least one of end surfaces of the magnet piece in a predetermined direction;
   stacking a plurality of magnet pieces formed in the forming step so that adjacent magnet pieces contact each other and the plurality of groove portions of one of the adjacent magnet pieces cross with the plurality of groove portions of another one of the adjacent magnet pieces; and
   inserting and disposing the plurality of magnet pieces stacked in the stacking step into a hole formed in a rotor core.

5. The production method for a rotor according to claim 4, wherein:
   the step of forming the magnet piece includes the step of dividing an integral molding into the plurality of magnet pieces by performing cut-off processing on the integral molding in a direction perpendicular to the predetermined direction; and
   the step of stacking the plurality of magnet pieces includes the step in which every other one of the plurality of divided magnet pieces in the predetermined direction are inverted in a rotation direction that is horizontal to cut surfaces of the magnet pieces, and the step in which the plurality of magnet pieces are stacked so that the cut surfaces of adjacent magnet pieces contact each other.

6. The production method for a rotor according to claim 5, wherein the cut-off processing is performed by using a rotary blade.

7. The production method for a rotor according to claim 4, wherein the predetermined direction coincides with a direction selected from the group consisting of a rotation axis direction of the rotor, a rotation direction of the rotor, and a radius direction of the rotor.

8. A permanent magnet-type rotary electric machine comprising a stator, and a rotor that is provided rotatably relative to the stator and that has been produced by the method described in claim 4.

9. The permanent magnet-type rotary electric machine according to claim 1, wherein the contact surface of the first magnet piece and the contact surface of the second magnet piece are devoid of an insulation material.

10. The production method for a rotor according to claim 4, wherein the contact surface of the first magnet piece and the contact surface of the second magnet piece are devoid of an insulation material.

* * * * *